Nov. 29, 1938.     W. E. GILKEY     2,138,489
RAFTING DOG
Filed April 19, 1937

INVENTOR.
William E. Gilkey
BY
ATTORNEYS.

Patented Nov. 29, 1938

2,138,489

UNITED STATES PATENT OFFICE 2,138,489

RAFTING DOG

William E. Gilkey, Anacortes, Wash.

Application April 19, 1937, Serial No. 137,821

4 Claims. (Cl. 9—15)

This invention relates to dogs and more especially to that character of rafting dog employed to couple the tow line from a tug to a log or logs being towed thereby.

The general object of the present invention is to provide a dog of advanced design and more particularly to provide a barbed form of rafting dog adapted to be applied vertically and which acts, under the influence of horizontal pull thereon, to convert the longitudinal and horizontal force of the pull to a substantially vertical embedding force to thereby wedge the dog progressively deeper into the log as the pulling stress increases, the practical range being limited only by that point of applied force beyond which the log tends to split.

The invention consists in the novel formation of a dog and the adaptation thereof as hereinafter described and claimed.

In the drawing:—

Figure 1:
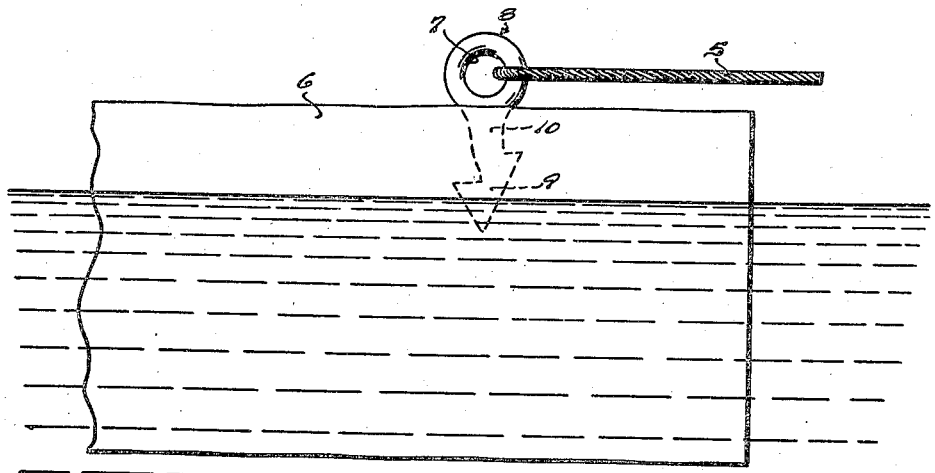
Figure 1 is a side elevational view representing a dog embodying the present invention as applied to a log being towed.
Figure 2:
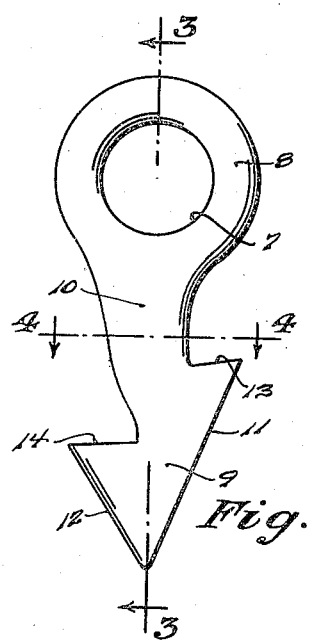
Fig. 2 is a similar view of the dog taken to an enlarged scale.
Figure 3:
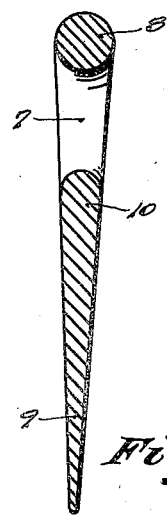
Fig. 3 is a transverse vertical section thereof, the section line being indicated by 3—3 in Fig. 2.
Figure 4:
Fig. 4 is a horizontal section taken on line 4—4 of Fig. 2.

The main tow line or bridle line which, as the case may be, is employed to couple the log being towed to the tug is passed through an eye 7 formed in the head 8 of the dog. The line and the log, illustrated in Fig. 1 only, are designated by 5 and 6, respectively.

Said dog, according to the present invention, is in edge elevation preferably of a wedge shape and at the lower end provides an embedding fluke 9 which connects with the head by a neck or shank 10. The direction of applied pulling force is of particular significance in considering the formation of the dog and I therefore denote that edge of the fluke which lies foremost in relation to the direction of applied stress by 11 and the other edge by 12. These edges, lying in upwardly diverging relation and in association with plane-faced approximately horizontal shoulders 13 and 14 marginally defining the two branches of the fluke, are of unequal lengths, the forward edge 11 being of greater length and thereby locating the related shoulder 13 in a plane off-set vertically above the plane ocupied by the shoulder 14. This upper shoulder 13 may, if desired, have a slight inclination to give the produced barb somewhat of an under-cut effect, a form which I find increases the resistance of the dog to dislodgment under extreme stress loads.

When embedded in the log, said lower shoulder 14 acts as a stress-receiving wall and its efficiency for this purpose is relatively in proportion to surface area. To increase this area over that which would be obtained by continuing, as a vertical prolongation, the rear edge of the shank 10, I curve said rear edge inwardly from a point opposite the shoulder 13. The general effect is that of a rectilineal line taken tangent to the head 8 and intersecting the transverse vertical center line of the dog on the horizontal plane of the shoulder 14.

In use, the dog with the upper barb lying foremost is pounded into the log to embed both barbs. As horizontal pulling strain is applied to the dog, the tendency of the dog to cant forwards transmits the load strain to the sustaining shoulder 14 which, resisting dislodgment, tends to force the point of the dog and the upper barb into the log about the shoulder 14 as a fulcrum. I indicate and prefer that the edge 11 be somewhat feathered and the edge 12 blunt as it facilitates driving the dog into the work and disengaging the same therefrom. Such disengagement is effected by directing horizontal blows from a sledge against the forward wall of the head 8 to drive the exposed head rearwardly.

Tests with the improved dog indicate that the same remains firmly lodged in the log under 6500 pound stress pulls and beyond this point the dog begins to creep and moves under mounting stress for an appreciable distance before giving way. Of the prior dogs, the spearhead form has been the most effective with a load limit of approximately 3000 pounds, a load strain which is frequently developed and particularly in rough weather when a dislodgment of the dog ordinarily results in a loss of the log tow. From the fact that load strains rarely reach 6500 pounds in even the most adverse weather conditions, the herein described dog can be considered practically proof against dislodgment under load stress.

It is my intention that the hereto annexed claims be given a scope in their interpretation commensurate with the advance in the art, no limitations being implied excepting as the same shall necessarily be particularly set forth to define over such art.

What I claim, is:—

1. A rafting dog formed to provide an embedding fluke and a head portion integral therewith having an eye for the attachment of a tow line to the dog, the fluke being barbed with two barb-forming branches marginally defined in each instance by a horizontal shoulder and by front and rear edges, respectively, of the fluke, each of said shoulders being relatively flat and the shoulder of the rear branch being disposed in vertically off-set relation below the other shoulder, said front edge of the fluke being feathered to form a relatively sharp edge.

2. The dog defined in claim 1 wherein the rear edge of the fluke is relatively blunt whereby said edge and the related shoulder of the fluke operate as load-sustaining walls to resist canting of the dog under the influence of load stress.

3. A rafting dog formed to provide a line-engaging head portion and an embedding fluke of which the fluke edges diverge upwardly from the point of the same with that edge which is adapted to lie foremost as respects the direction of pull on the dog being feathered to form a relatively sharp edge and the rear edge being blunt, both the front and the rear edge of the fluke being barbed with the front-edge barb lying in a plane offset above the plane occupied by the rear-edge barb.

4. A rafting dog formed to provide a line-engaging head portion and an embedding fluke of which the fluke edges diverge upwardly from the point of the same with that edge which is adapted to lie foremost as respects the direction of pull on the dog being feathered to form a relatively sharp edge, both the front and the rear edge of the fluke being barbed with the front-edge barb lying in a plane offset above the plane occupied by the rear-edge barb, and the shoulder which is formed by said front-edge barb receding rearwardly from the point of the barb to lie at an inclination to a plane taken horizontally through the upright dog.

WILLIAM E. GILKEY.